(12) United States Patent
Wang et al.

(10) Patent No.: US 8,948,781 B2
(45) Date of Patent: Feb. 3, 2015

(54) CONTROLLING OPERATIONAL STATES OF A LOCATION SENSING SYSTEM OF A MOBILE DEVICE

(71) Applicant: Alohar Mobile Inc., Palo Alto, CA (US)

(72) Inventors: Chenyu Wang, Mountain View, CA (US); Jun Yang, Milpitas, CA (US); Sam Song Liang, Palo Alto, CA (US); Jianming Zhou, Sunnyvale, CA (US)

(73) Assignee: Alohar Mobile Inc., Palo Alto, CA (US)

( * ) Notice: Subject to any disclaimer, the term of this patent is extended or adjusted under 35 U.S.C. 154(b) by 246 days.

(21) Appl. No.: 13/655,326

(22) Filed: Oct. 18, 2012

(65) Prior Publication Data
US 2013/0102268 A1 Apr. 25, 2013

Related U.S. Application Data

(60) Provisional application No. 61/549,855, filed on Oct. 21, 2011.

(51) Int. Cl.
H04B 1/16 (2006.01)
H04W 24/00 (2009.01)
H04B 1/38 (2006.01)
H04M 1/725 (2006.01)
G01S 19/34 (2010.01)
(Continued)

(52) U.S. Cl.
CPC ........... *H04M 1/72572* (2013.01); *G01S 19/34* (2013.01); *H04W 4/02* (2013.01); *H04W 52/0251* (2013.01)
USPC .................. 455/456.1; 455/343.2; 455/456.6; 455/574

(58) Field of Classification Search
CPC .............. H04W 4/02; H04W 52/0251; H04W 52/0254; H04W 52/283; H01S 19/34
USPC .................. 455/456.1, 456.6, 13.4, 574, 457, 455/343.1–343.2
See application file for complete search history.

(56) References Cited

U.S. PATENT DOCUMENTS

| 5,592,173 | A | 1/1997 | Lau et al. |
| 6,975,941 | B1 * | 12/2005 | Lau et al. ...................... 701/491 |
| 7,330,729 | B2 * | 2/2008 | Niwa et al. .................. 455/456.6 |

(Continued)

OTHER PUBLICATIONS

PCT; Notification of Transmittal of the International Search Report and the Written Opinion of the International Searching Authority, or the Declaration, International Application No. PCT/US 12/61062, International Filing Date Oct. 19, 2012.

*Primary Examiner* — Simon Nguyen
(74) *Attorney, Agent, or Firm* — Brian R. Short

(57) ABSTRACT

Methods, systems and apparatuses for controlling a location sensing system of a mobile device are disclosed. One method includes collecting location related information of the mobile device. The method further includes controllably setting the mobile device to operate in one of a high-power state, a low-power state, or a transitional state based on the collected location related information, wherein a satellite-based positioning system receiver of the mobile device generates location information in the transitional state and in the on-state, and the satellite-based positioning system receiver does not generate location information in the low-power state. When operating in the transitional state, the mobile device repeatedly checks the collected location related information and transitions to the low-power state or the high-power state based on the collected location related information.

24 Claims, 5 Drawing Sheets

(51) Int. Cl.
   *H04W 4/02* (2009.01)
   *H04W 52/02* (2009.01)

(56) References Cited

U.S. PATENT DOCUMENTS

| | | | |
|---|---|---|---|
| 7,633,389 B2 * | 12/2009 | Mantovani et al. | 340/539.3 |
| 8,022,870 B2 | 9/2011 | Malaney | |
| 8,072,379 B2 | 12/2011 | Gopinath | |
| 8,195,192 B2 | 6/2012 | Chow et al. | |
| 8,463,545 B2 * | 6/2013 | Boore et al. | 701/533 |
| 2003/0109988 A1 | 6/2003 | Geissier | |
| 2005/0083230 A1 * | 4/2005 | Harvey et al. | 342/357.06 |
| 2009/0054075 A1 * | 2/2009 | Boejer et al. | 455/456.1 |
| 2009/0098880 A1 * | 4/2009 | Lindquist | 455/456.1 |
| 2009/0315767 A1 * | 12/2009 | Scalisi et al. | 342/357.07 |
| 2010/0039316 A1 * | 2/2010 | Gronemeyer et al. | 342/357.06 |
| 2010/0130229 A1 | 5/2010 | Sridhara et al. | |
| 2011/0050503 A1 | 3/2011 | Fong et al. | |
| 2012/0088519 A1 | 4/2012 | Agardh et al. | |
| 2012/0122493 A1 * | 5/2012 | Yato | 455/456.6 |
| 2012/0313817 A1 * | 12/2012 | Underbrink et al. | 342/357.72 |

* cited by examiner

CONTROLLING OPERATIONAL STATES OF A LOCATION SENSING SYSTEM OF A MOBILE DEVICE

RELATED APPLICATIONS

This patent application claims priority to U.S. Provisional Patent Application Ser. No. 61/549,855, filed Oct. 21, 2011, which is herein incorporated by reference.

FIELD OF THE DESCRIBED EMBODIMENTS

The described embodiments relate generally to location-based services. More particularly, the described embodiments relate to methods, systems and apparatuses for controlling operational states of a location sensing system of a mobile device.

BACKGROUND

Location-based mobile applications have become increasingly popular on smart phones over the past years, such as local search, mobile social networking, mobile advertising etc. Unfortunately, satellite-based positioning systems, an enabler of location based applications, are power-hungry and its intensive usage can drain the battery of mobile devices within a few hours.

Numerous solutions have been proposed to improve the battery life of mobile devices running such applications. One commonly used solution, duty-cycling GPS (global positioning system) sampling intervals puts, for example, a GPS receiver sleep between adjacent location updates and save power consumption. Such a simple solution can improve battery life by acquiring location information less frequently, but can damage the quality of collected location data. Other existing solutions use motion sensor such as accelerometer to turn on or off GPS hardware when user is stationary or moving. Such accelerometer augmented GPS control mechanism may cause undesired GPS measurements, for example, when a user is walking inside a building, and cause an unexpected GPS power-off when the user is moving with a constant velocity on, for example, the highway. There are some other solutions that use current speed information of GPS itself to adjust the sampling rate of GPS. However, these solutions may have serious error propagation as GPS speed information is not accurate sometimes.

It is desirable to have a mobile device that includes power control of location determination receivers.

SUMMARY

An embodiment includes a method of controlling a location sensing system of a mobile device. The method includes collecting location related information of the mobile device. The method further includes controllably setting the mobile device to operate in one of a high-power state, a low-power state, or a transitional state based on the collected location related information, wherein a satellite-based positioning system receiver of the mobile device generates location information in the transitional state and in the on-state, and the satellite-based positioning system receiver does not generate location information in the low-power state, and the satellite-based positioning system receiver consumes less power in the low-power state than in the high-power state and the transitional state. Further, when operating in the transitional state, the mobile device repeatedly checks the collected location related information and transitions to the low-power state or the high-power state based on the collected location related information, or if a transition is not made after a predetermined period of time, the controller automatically transitions the satellite-based positioning system receiver into either the high-power state, a low-power state.

Another embodiment includes a mobile device. The mobile device includes a satellite-based positioning receiver and a controller. The controller is operative to set the mobile device to operate in one of a high-power state, a low-power state, or a transitional state based on the collected location related information, wherein the satellite-based positioning system receiver of the mobile device generates location information in the transitional state and in the on-state, and the satellite-based positioning system receiver does not generate location information in the low-power state, and the satellite-based positioning system receiver consumes less power in the low-power state than in the high-power state and the transitional state. Further, when operating in the transitional state, the controller repeatedly checks the collected location related information and transitions to the low-power state or the high-power state based on the collected location related information, or if a transition is not made after a predetermined period of time, the controller automatically transitions the satellite-based positioning system receiver into either the high-power state, a low-power state.

Other aspects and advantages of the described embodiments will become apparent from the following detailed description, taken in conjunction with the accompanying drawings, illustrating by way of example the principles of the described embodiments.

DETAILED DESCRIPTION

Figure 1:
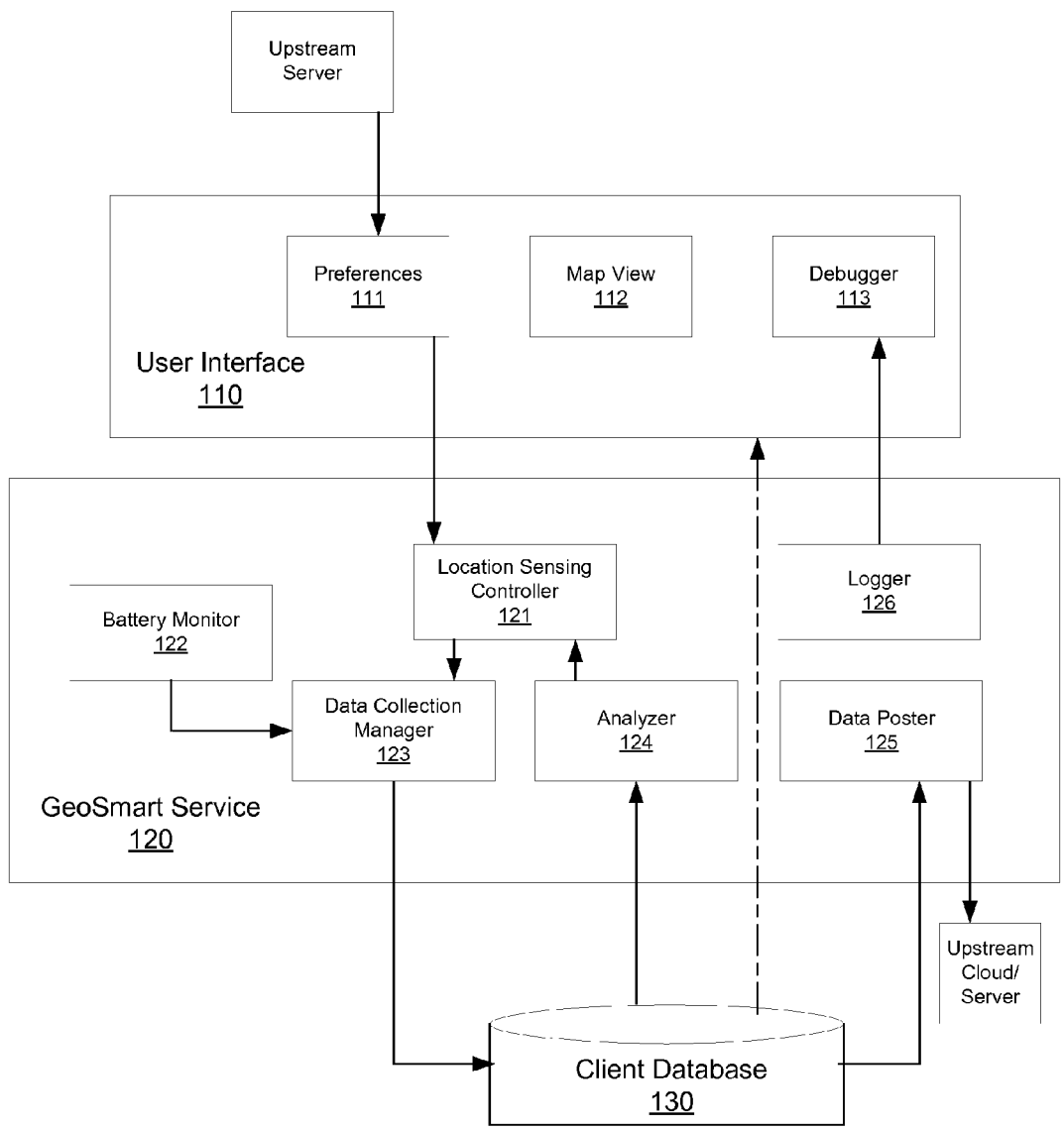
FIG. 1 shows a functional block diagram of a location based service of a mobile device, according to an embodiment.

The described embodiments provides systems, methods and apparatuses for improving the battery life of mobile phones that continuously run location based applications based on location information of a GPS receiver (also referred to as a satellite-based receiver). The collected GPS data and location related sensor data are maintained at a high quality for certain specific application requirements. Generally, the described embodiments include a transitional state wherein a determination is made whether to set a satellite-based location receive in either a high-power or a low-power state. The transitional state adds intelligence and determines when the GPS receiver should be turned on, thereby reducing the amount of power used by the GPS receiver. The GPS receiver can be more generally referred to as a satellite-based positioning system receiver.

For an embodiment, the transitional state includes a GPS wakeup state. An alternate or additional state includes a GPS standby state. The multiple (greater than two) proposed states allow for avoidance of undesired binary operations of GPS turning on or off, and to provide realization of an agile GPS controller for all possible cases. Embodiments of the GPS standby state allow for power savings and reduction if movement of the mobile device is predictable (for example, the mobile device is moving at a constant velocity). Additionally, embodiments include the use low-power sensors, such as accelerometer and surrounding wireless network information to allow high-power GPS location sensing to turn on or off adaptively based on a user's motion states and location behavior (inside or outside of a building or structure). At least some embodiments include collecting GPS location data and location related data (network based location, motion state, Wi-Fi APs, surrounding Bluetooth devices) simultaneously during location sensing, and synchronizing and formatting data from multiple sensor for potential location based applications operating on the client (the mobile device) or in cloud servers.

Evaluation of mobile device users shows that for normal usage, the described embodiments can provide location sensing and data collecting system that can significantly improve battery life of a mobile device. The collected location data is useable for several emerging location-based systems, such as automatic POI (point of interest, or place of interest) determination, mobile user location profiling and route-based mobile advertisement generation.

The described embodiments provide solutions to the many problems. First, the described embodiments address how to avoid undesired frequent binary operations of turning a location receiver (such as, GPS) on and off. Additionally, the described embodiments allow a combination of GPS information with multiple sensor information to perform optimal power efficient location sensing. Further, the described embodiments efficiently collect GPS data and location related data to satisfy the requirements of certain specific location based applications.

FIG. 1 shows a functional block diagram of a location based service of a mobile device, according to an embodiment. This functional block diagram can be functionally implemented an Apple® iPhone, or on different vendor types of Android® smart phones, such as Samsung®, HTC®, or Motorola®, as application software downloaded to the smart phone.

An embodiment of a central control can be referred to as a GeoSmart service 120. For an embodiment, the GeoSmart service 120 interacts with a User Interface layer 110. For an embodiment, the GeoSmart service 120 manages a Location Sensing Controller 121, a Battery Monitor 122, a Logger 126 and a Data Poster 125.

For an embodiment, the Location Sensing Controller 121 controls the GPS state transitions. For at least some embodiments, the Location Sensing Controller 121 operates in time increments, such as once every half a minute. Based on a current GPS state and information obtained from analyzed information, the Location Sensing Controller 121 determines the GPS states.

For an embodiment, the Battery Monitor 122 logs how much battery life is left. For an embodiment, the logging occurs continuously over time, and at predetermined increments of time.

For an embodiment, the Data Poster 125 periodically reads data from a Client Database 130, and sends compressed and encrypted data to a remote server.

For an embodiment, the Logger 126 writes logs into a buffer which are displayed by a Debugger 113 of the User Interface 110.

For an embodiment, the Location Sensing Controller 121 includes a GPS receiver. For an embodiment, the Location Sensing Controller 121 receives inputs from an Analyzer 124 that is interfaced with a Client Database 130, and the Location Sensing Controller 121 determines when and how to collect location related data. For an embodiment, data output of the Location Sensing Controller 121 is passed to a Data Collection Manager 123, which synchronizes, formats and records data into the Client Database 130. For at least some embodiments, the Data Poster 125 periodically retrieves data from Client Database 130 and posts (uploads) to cloud servers for large-scale location data analysis.

For an embodiment, the Data Collection Manager 123 gets readings from the sensors of the mobile device, and writes the sensor readings into client data with a defined format, which is written (stored) in the client database 130.

For an embodiment, the Analyzer 124 includes a set of one or more algorithms that operate on data collected (read from client database 130) and calculates a set of true/false decisions which are used by Location Sensing Controller 121 to determine the selected GPS state.

For an embodiment, the Client Database 130 provides temperate data storage (with encryption) on the mobile device client before posting to a remote server.

For at least some embodiments, the User Interface 110 sets parameter Preferences 111 of the system (mobile device), checks Debugger 113 information output from the Logger 126, and provides configurations to GeoSmart Service 120. For embodiments, the Logger 126 and Debugger 113 are enabled for software debugging purpose and disabled for software release purpose.

For an embodiment, the Map View 112 provides location data visualization that a user can use to interpret the location information.

For an embodiment, a Debugger 113 includes a screen that contains debugging logs from the mobile device client.

Figure 2:
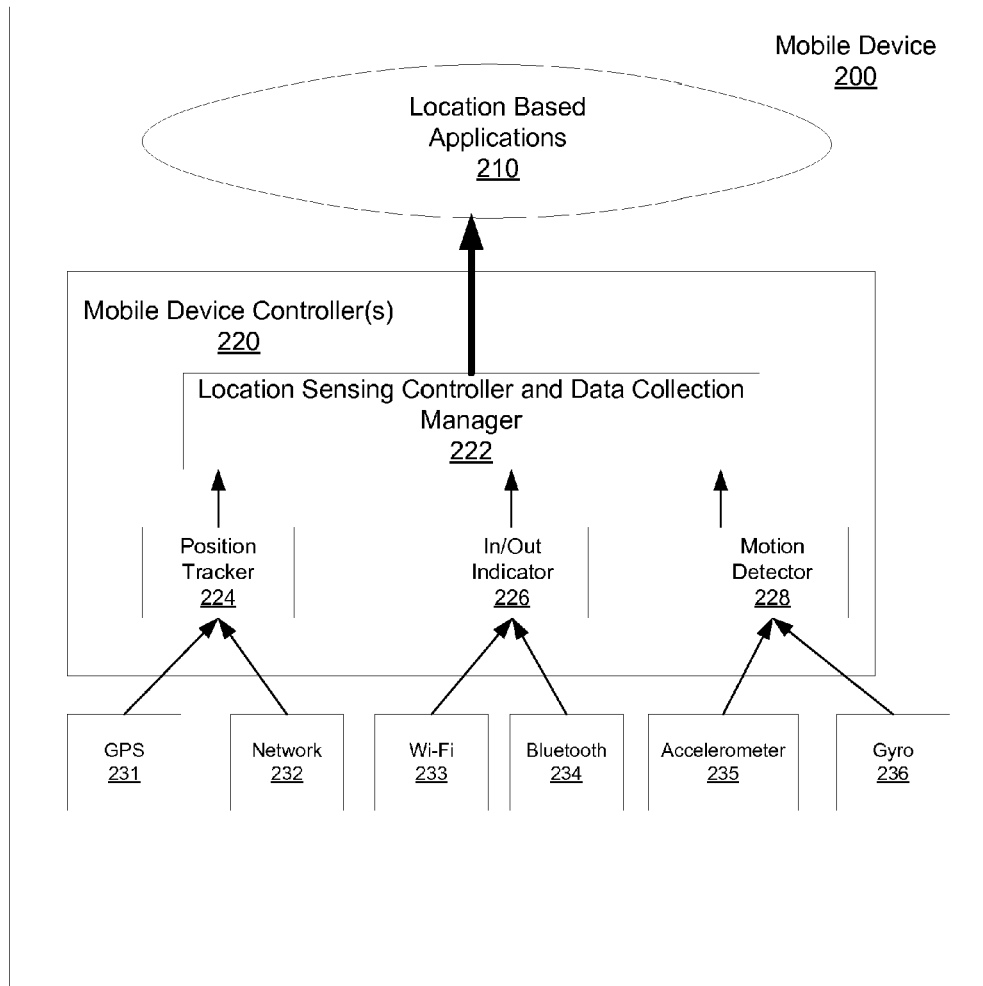
FIG. 2 shows a block diagram of controllers and sensors of a mobile device for location based service, according to an embodiment.

FIG. 2 shows a block diagram of controllers and sensors of a mobile device 200 for location based service, according to an embodiment. While shown as separate controllers, it is to be understood that the functionality of the controllers can be included within any combination of one or more controllers. Additionally, while shown as controllers of the mobile device, it is to be understood that the mobile device is able to communicate with upstream servers, and any portion of the control can be off loaded to external controllers.

As depicted, a mobile device controller 220 of FIG. 2 includes has three components, a Position Tracker 224, In/Out Indicator 226, Motion Detector 228. The Position Tracker 224 tracks GPS data 231 and reads Network location data 232 from the mobile device, and calculates movement features like speed and location centroid. The In/Out Indicator 226 reads (receives and decodes) surrounding RF signals, such as Wi-Fi 233 and Bluetooth 234, and decides whether user is inside or outside of a house, building or structure. The Motion Detector 228 continuously reads accelerometer data 235 and/or Gyro data 236 and decides whether the mobile device is moving or stationary. For at least some embodiments, the Position Tracker 224, the In/Out Indicator 226, and the Motion Detector 228 operate mutually dependent of each other and provide switch logics (information) to a Location Sensing Controller 222. Location Sensing Controller 222 then selects a mobile device state (high-power state, low-power state, transitional state (for example, wakeup) or a standby state). For an embodiment, the selection is based on a voting wherein each of the Position Tracker 224, the In/Out Indicator 226, and the Motion Detector 228 each provide a state transition vote. How many votes are required is adjustable. For an embodiment, a majority vote is needed to change (transition) states.

For an embodiment, the Location Sensing Controller 222 receives inputs from the Position Tracker 224, the In/Out Indicator 226, and the Motion Detector 228, and provides a determination and selection of which state (high-power state, low-power state, transitional state (for example, wakeup) or a standby state) the GPS receiver is to be operating in. For an embodiment, the Location Sensing Controller 222 controls sampling of network location data, motion sensor data and Wi-Fi fingerprints as well as GPS points, which provide data sources for a Data Collection Manager portion of the Location Sensing Controller 222 to post location-related data for location-based applications to the cloud. Location based application 210 can then utilize the location information of the Location Sensing Controller 222.

Figure 3A:
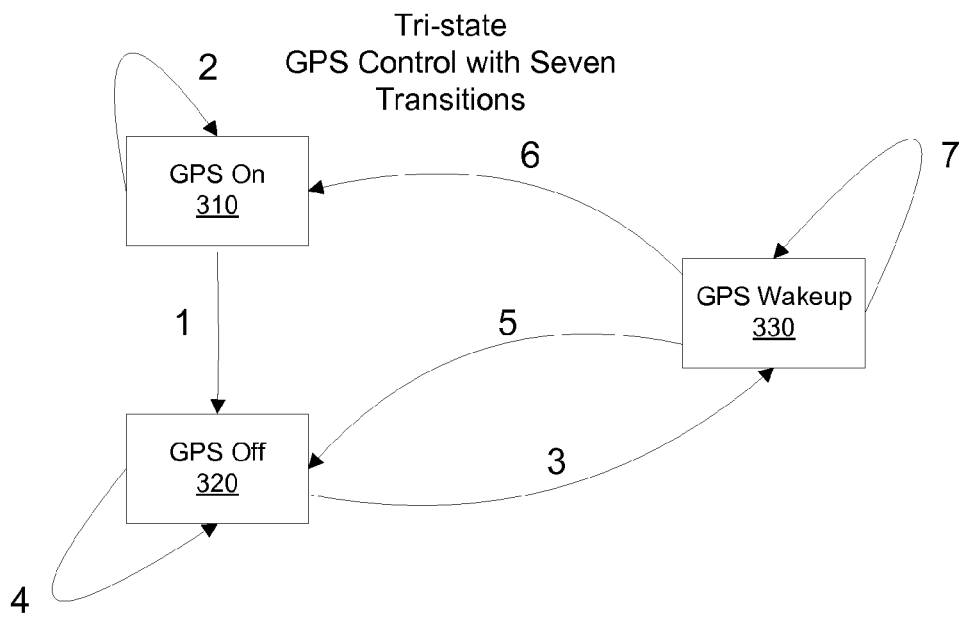
FIG. 3A shows a state diagram of a tri-state GPS controller, according to an embodiment.

FIG. 3A shows a state diagram of a tri-state GPS controller, according to an embodiment. The control of the selection of the three states provides for power-efficient location sensing. For an embodiment, the three states include: a GPS On (high-power) state, wherein the GPS is on and running, a GPS Off (low-power) state, wherein GPS is turned off or operating at zero or very low power level, and a GPS Wakeup (transitional) state, which includes a transitional state with GPS running. For the wakeup state, after collecting enough information, the GPS controller makes a decision as to either transition to GPS On or GPS Off or maintain its present state.

As shown in FIG. 3A, this embodiment includes seven transitional conditions that control the GPS receiver. Various conditions of the mobile device determine when the transitions occur.

An exemplary transition "1" from the GPS On state to the GPS Off state can occur, for example, if the mobile device determines the GPS receive signals have been lost, the user is not changing location, and/or a determination is made that the user has entered a building. Powering down the GPS receiver saves power.

An exemplary transition "2" from GPS On state to the GPS On state can occur, for example, when a speed of the GPS receiver and the mobile device remains high (greater than a threshold). This indicates that the user is moving, and location information is beneficial, thereby suggesting that the GPS receive should remain on.

An exemplary transition "3" from GPS Off state to the GPS wakeup state can occur, for example, when In/Out indicator and motion detector indicate that the user may start to move, or a new network location count (counting the new distinct network locations which is rounded to, for example, 100 meters act as a filter of noise) has reached a threshold. The GPS receive is "woken up" because a determination is made that the user is or is preparing to move, and thereby, location information provided by the GPS receiver is needed. Note that for this embodiment, a transition to the GPS Wakeup state can only come from the GPS Off state. The GPS Wakeup state can be maintained, but only for a time-out period of time.

An exemplary transition "4" from GPS Off state to the GPS Off state can occur, for example, if the motion sensors indicate that the user is stationary or WiFi sensing indicates the mobile device is still inside a building or structure. The GPS receiver remains at an off or low-power condition to save power.

An exemplary transition "5" from GPS Wakeup state to the GPS Off state can occur, for example, if a wakeup determination is a false alarm after checking 1) speed of the mobile device, and 2) the location of the mobile device has not changed or the mobile device is still located near the centroid of recent location samples. The GPS receiver is turned back off to save power. This transition can occur automatically after a threshold period of time. That is, the GPS Wakeup state is a transitional state, which is not to be maintained for an indefinite period of time. If a decision to switch to the GPS On state or the GPS Off state is not made within a timeout period, then an embodiment includes automatically switching to the GPS Off state.

An exemplary transition "6" from GPS Wakeup state to the GPS On state can occur, for example, if after turning on the GPS receiver on and user (the mobile device) is determined to have a high speed (greater than a threshold) or the location of the mobile device has changed greater than a threshold. The user is determined to be moving, and therefore, the GPS receiver is turned on.

An exemplary transition "7" from GPS WakeUp state to the GPS WakeUp state can occur, for example, if the mobile device does not reach any of the thresholds needed to transition to the GPS On state or the GPS Off state, thereby suggesting that the controller does not have enough information to make a transition decision. As previously stated, the GPS Wakeup state is a transitional state, which is not to be maintained for an indefinite period of time. Therefore, if a GPS On is not obtained after a predetermined amount of time, the GPS receiver is transitioned ("5") to the GPS Off state.

At least some embodiments include a set of rules (switching rules) to be maintained during operation in the three described GPS states—GPS On, GPS Off and GPS Wakeup.

For embodiments of the GPS On state, GPS Off/GPS On switch rules include a current speed check. For embodiments, the current speed check includes checking the speed of the mobile device. If the current speed returned from a location reading of GPS device is larger than a threshold, then the switch rule determines to keep GPS on. For an embodiment, if current speed is high (for example, in a situation like driving on the highway) GPS can be periodically turned on to get one GPS reading and then turned off for a few minutes to save the energy of GPS sensing.

For another embodiment of the GPS On state, the GPS Off/GPS On switch rule includes determining a no-data check. For example, if no GPS signal is available, a no-data-counter is incremented. If the no-data-counter reaches a value larger than a threshold, then turn off GPS. Essentially, if no GPS signal is available, there is no reason to maintain the GPS receiver on.

For another embodiment of the GPS On state, the GPS Off/GPS On switch rule includes determining a speed ratio, wherein the speed ratio provides a representation of what ratio of an analyzed period of time, the calculated speed of the mobile device is at a speed. For an embodiment, a high-speed-ratio (for example, 1 m/s or higher regard as high speed) from computed average speed is computed from recent GPS points. For an embodiment, if the high speed ratio is greater than a low threshold, then the decision is made to remain in GPS On state. For an embodiment, if the high speed ratio is less than a low threshold, then the decision is made to turn off the GPS receiver (GPS Off state). Further, motion sensors of the mobile device can be utilized as well. For an embodiment, if one or more motion sensors detect no or little (below a motion threshold, or standard deviation of sense acceleration is below a threshold) for a predetermined number of counts, then the decision is made to turn off the GPS receiver (GPS Off state). Further, WiFi sensors are utilized to determine if the mobile device is within a structure or building. For example, for an embodiment, if an In/Out detector detecting whether the mobile device enters a building by detecting increased Wi-Fi access points, then shut down GPS after a period of time.

For an embodiment of the GPS Off state, the GPS Off/GPS Off switch rule includes the In/Out detector computing a similarity of Wi-Fi strength "vector" between current scan and historical few scans. If minimum-similarity is less than a threshold, then WiFi reception is determined to have changed and the GPS is set to the GPS Wakeup state. That is, motion of the mobile device is determined based on the detection change in the WiFi network reception. For another embodiment, if signal strength in historical WiFi scans is stronger than the current WiFi scan, and the difference (drop) in strength is larger than a threshold, then WiFi reception is determined to have decreased, then the GPS is set to the GPS Wakeup state. An embodiment further includes utilizing motion sensors of the mobile device. For an embodiment, if the motion sensors sense motion less than a motion threshold (that is, for example, a standard deviation of sensed acceleration is less than a threshold), then the GPS Off state is maintained. For an embodiment, if a current network location (for example, sensed WiFi or cell tower location) is far from the centroid of recent location samples (for example, an averaged location) of the a period of time (such as, the past several minutes), then the GPS is set to the GPS Wakeup state. An embodiment further includes detection of reception of the mobile device of new networks. That is, when a new network location appears, the GPS is set to the GPS Wakeup state.

For an embodiment of the GPS WakeUp, the GPS WakeUp switch rule includes determining a current speed. For an embodiment, the GPS WakeUp switch rule includes checking a maximum current speed of the mobile device within a period of time, and if the maximum current speed during the period of time is determined to be larger than a threshold, the GPS is set to the GPS On state. For another embodiment, the GPS WakeUp switch rule includes determining whether a centroid of the location of the mobile device has moved. For an embodiment, if the current position (location) is far away (greater than a location threshold) from the centroid of a period of time (for example, the past few minutes) then the GPS state is changed. For an embodiment, if the distance moved (change of location centroid) is greater than the threshold, then the GPS is set to the GPS On state. For an embodiment, if the distance moved (change of location centroid) is less than the threshold, then the GPS is maintained (remains) at the GPS WakeUp state. Further, an embodiment includes computing an average speed from recently determined GPS points (samples). For an embodiment, if the average speed ratio is determined to be greater than a high threshold, then the GPS is set to the GPS On state. For an embodiment, if the average speed ratio is determined to be less than a high threshold, then the GPS is set to the GPS Off state.

If is to be understood that combinations of multiple of the described rules can be utilized to obtain a higher confidence in GPS location sensing, and the selection in the GPS states.

Figure 3B:
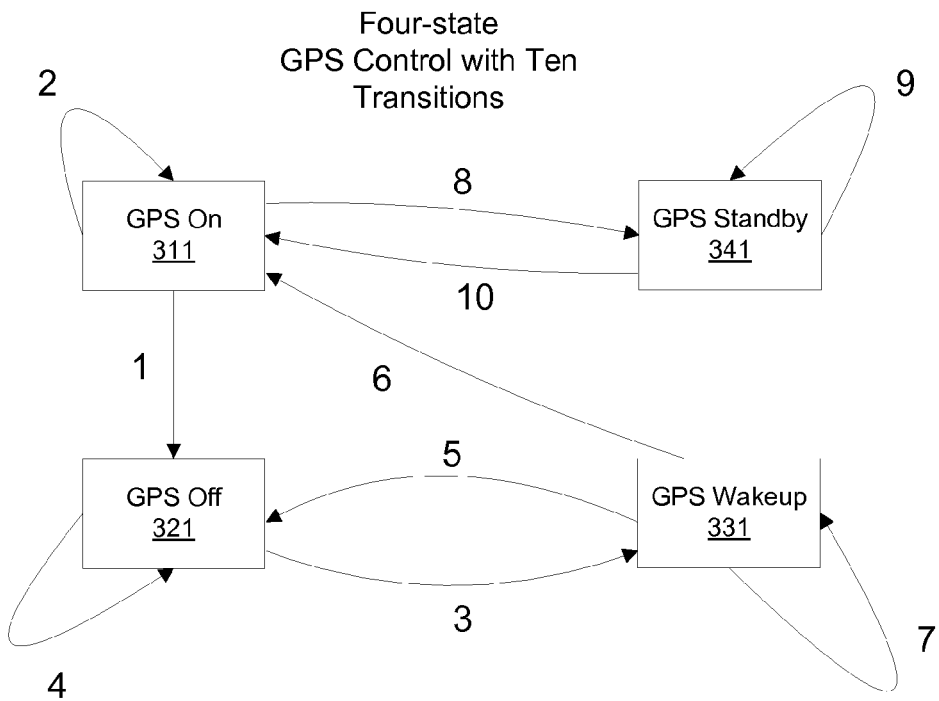
FIG. 3B shows a state diagram of a four-state GPS controller, according to an embodiment.

FIG. 3B shows a state diagram of a four-state GPS controller, according to an embodiment. The four states include the previously described GPS On, GPS Off and GPS Wakeup states, and further, a GPS Standby state. For an embodiment, the GPS standby state is a state wherein the GPS receiver is off or not operational (or more specifically, not generating location information). After collecting enough information, the GPS controller switches from GPS On to this state, maintains this state for a while, and switch back to GPS On if possible.

The first seven of the ten transitional states are the same as the seven transitional states previously described.

An exemplary transition "8" from GPS On state to GPS Standby state can occur, for example, if the mobile device is determined to be moving (at a constant speed) smoothly (such as a constant speed with sense acceleration below a threshold) the mobile device can with a high speed. That is, the GPS receiver can be turned off because the change is location of the mobile device is very predictable, and therefore, the precision of the GPS receiver is not required for determining the location of the mobile device.

An exemplary transition "9" from GPS Standby state to the GPS Standby state can occur, for example, if the mobile device is determined to maintain a smooth (for example, constant velocity, wherein a standard deviation of sense acceleration is less than a threshold). That is, the GPS Standby state is maintained, and the GPS receiver remains turned off because the location of the mobile device can be predictably determined without the GPS receiver.

An exemplary transition "10" from GPS Standby state to the GPS On state can occur, for example, if the mobile device is determined to not be moving smoothly. That is, the location cannot be dependably determined without the GPS receiver, and therefore, the GPS receiver needs to be turned on. The stability of the velocity of the mobile device can be estimated base on the sensed signals of the motion sensors of the mobile device.

Embodiments of the GPS On, GPS Off and GPS Wakeup state switching rules have been described. For an embodiment of the GPS Standby state, the GPS Standby switch rules include determination of how constant (not deviating) the velocity of the mobile device is determined to be. That is, of the motion sensor keeps detecting the device moving smoothly, GPS remains on standby. If the motion sensor detects the smooth moving pattern is broken, turn on the GPS receiver is turned on as directed by the GPS On state.

Note that multiple rules in each state switch can be combined together and get a higher confidence of decision to control GPS location sensing.

For at least some embodiments, the GPS On State and GPS Wakeup state include two different thresholds for transitioning to the GPS Off state. These correspond to the transitions "1" and "5" of FIGS. 3A and 3B. That is, the controller is more likely to transition from the GPS Wakeup state to the GPS Off state, than to transition from the GPS On state to the GPS Off state. More specifically, the conditional requirements of the location related information for maintaining the GPS On state are not as hard to meet as the conditional requirements of the location related information for maintaining the GPS Wakeup state. One reason for this is that this configuration ensures that includes the transition between (back and forth) the GPS Off and the GPS Wakeup, and the one-way transition from the GPS Wakeup to the GPS On, suffers from much fewer false alarms than a configuration that just includes the transition between GPS Off and GPS On. This makes the mobile device less likely to toggle between turning the GPS receiver on and off, thereby avoiding a power wasting condition.

For at least some embodiments, the GPS Wakeup state has a timeout limit, and after the timeout, the mobile device automatically transitions to the GPS Off state. That is, the controller of the mobile device maintains the GPS Wakeup state for a period. During the period the controller continuously monitors and checks the location related information and/or the location information of the GPS receiver. If during this period a decision is not made to transition the mobile device to either the GPS On state or the GPS Off state, the controller automatically transitions the mobile device to the GPS Off state. For at least some embodiments, the GPS On state does not include a timeout condition. This provides additional contrast between the GPS On state and the GPS Wakeup state even though the GPS receiver is operation in both the GPS On state and the GPS Wakeup state.

For at least some embodiments, the thresholds or conditions of the location related information required to cause a mobile device state change are adaptively adjustable. For an embodiment, they are adaptively adjusted based on a phone type and/or model of the mobile device. For another embodiment, the thresholds or conditions are based on an application running on the mobile device. That is, for example, different applications require different levels of accuracy or more battery life, and therefore, the thresholds or conditions of the location related information can be adaptively adjusted or selected based on applications. For another embodiment, the thresholds or conditions are adaptively adjusted based on an amount of battery charge of the mobile device. That is, for example, the conditions for selecting the states (GPS On state, GPS Wakeup state) that turn on the GPS receiver may be more stringent when the charge of the battery falls below a threshold, thereby conserving more power as the charge of the battery of the mobile device goes down.

For an embodiment, the sample rate of the GPS receiver is different (for an embodiment, greater) for the GPS Wakeup state than for the GPS On state.

For embodiment, the location related data during wakeup state is used to make decision whether to go to GPS On State. In contrast, for an embodiment, the location related data collected during GPS On State is used for POI determination.

As previously stated, the GPS receiver is non-operational (not generating location data or samples) in the GPS Off state and the GPS Standby state. However, for embodiments, there are several notable differences between the GPS Off state and the GPS Standby state. For an embodiment, the thresholds and/or requirements of the collected location related information for transitioning from GPS Off state to GPS Wakeup is harder to meet than the thresholds and/or requirements of the collected location related information for transitioning from GPS Standby to GPS On. Both of these transitions involve physically turning on the GPS receiver of the mobile device. Further, for an embodiment, the GPS Standby state is selected when the mobile device is moving at a consistent speed (that is, acceleration is maintained below a threshold), wherein the speed is greater than a speed threshold. As such, these conditions are no conducive to receiving WiFi signals. Therefore, in the GPS Standby state, there typically is no need to analyze WiFi network signatures. That is, for example, the GPS Standby state may be selected when the user of the mobile device is driving. However, WiFi signals are typically very weak when driving. However, in the GPS Off state, WiFi signals and WiFi network signatures are analyzed in at least one embodiment. For an embodiment, the sensed motion of GPS Standby State only relies on motion sensing of the mobile device, and therefore, the threshold of detected motion for transitioning back to the GPS On state may be relatively low. However, the motion sensor threshold in the GPS Off state is much harder to reach, to avoid false alarms. For example, a use may be merely walking around inside a building, and the motion threshold for transitioning to the GPS Wakeup state is ideally higher (harder to reach). Further, for an embodiment, the delay time between transitioning from GPS Standby State is lower than the delay time for transitioning from the GPS Off state.

Figure 4:
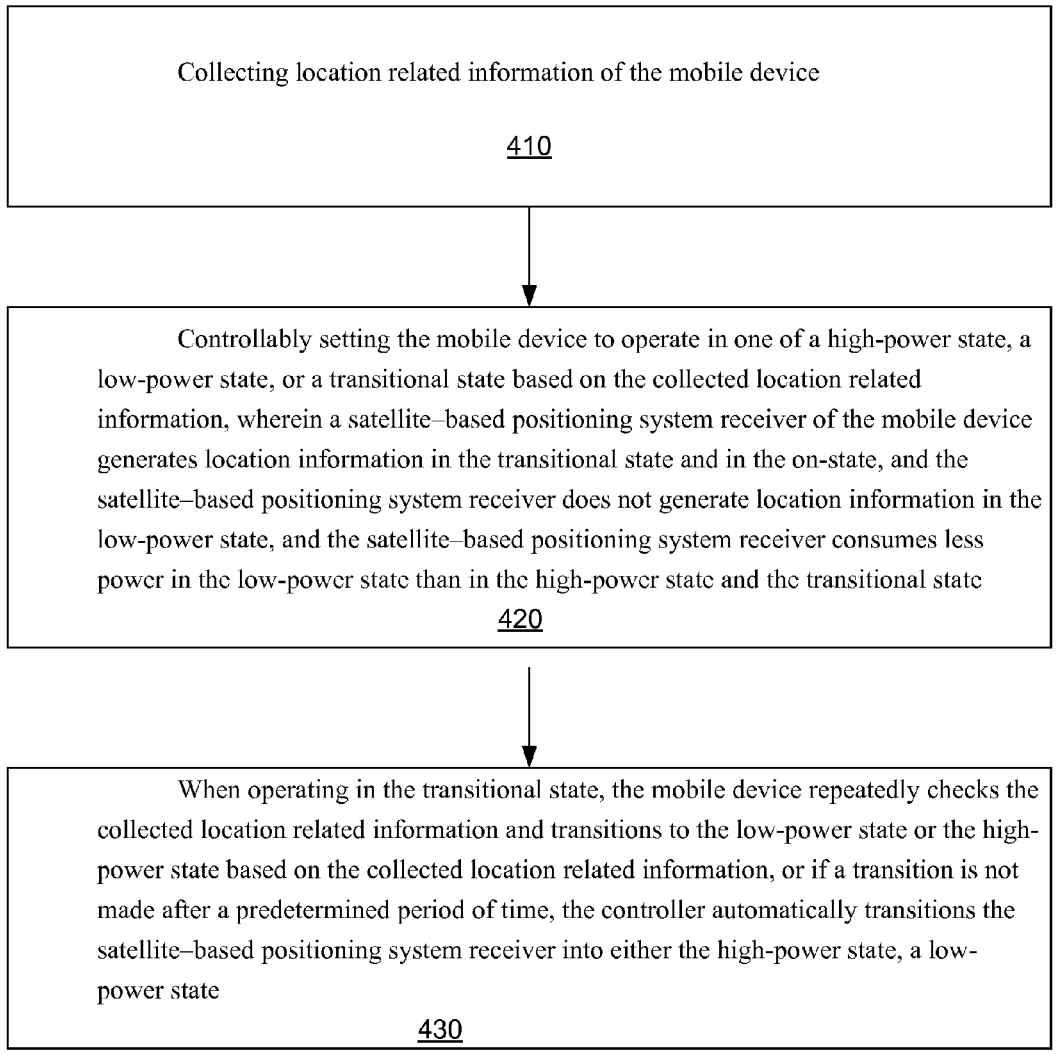
FIG. 4 is a flow chart that includes steps of a method of controllably setting the states of a satellite-based positioning system receiver of a mobile device, according to an embodiment.

For another embodiment, the GPS Off state also causes the mobile device to enter or select system sleep state, wherein, for example, a central controller of the mobile device powers down. For sensing motion while in the deep sleep, the motion sensor read processing continues without the central processor. However, for at least some embodiments, the GPS Standby does not allow system sleep. The motion sensing reaches some threshold and wakes up system and to make CPU up and running FIG. 4 is a flow chart that includes steps of a method of controllably setting the states of a satellite-based positioning system receiver of a mobile device, according to an embodiment. A first step 410 includes collecting location related information of the mobile device. A second step 420 includes controllably setting the mobile device to operate in one of a high-power state, a low-power state, or a transitional state based on the collected location related information, wherein a satellite-based positioning system receiver of the mobile device generates location information in the transitional state and in the on-state, and the satellite-based positioning system receiver does not generate location information in the low-power state, and the satellite-based positioning system receiver consumes less power in the low-power state than in the high-power state and the transitional state. Further, when operating in the transitional state, a third step 430 includes the mobile device repeatedly checking the collected location related information and transitioning to the low-power state or the high-power state based on the collected location related information, or if a transition is not made after a predetermined period of time, the controller automatically transitions the satellite-based positioning system receiver into either the high-power state, a low-power state. That is, after continuously checking the collected location related information for an indication of whether to switch to the low-power state or the high-power state, if after the predetermined period of time no such indication has been received, the low-power state is automatically selected.

For an embodiment, the satellite-based positioning system receiver operating means the satellite-based positioning system receiver is determining location information. For an embodiment, the satellite-based positioning system receiver not operating includes the satellite-based positioning system receiver not determining location information. When not determining location information, the power consumed by the satellite-based positioning system receiver is less than when the satellite-based positioning system receiver is determining location information. For and embodiment, the satellite-based positioning system receiver not operating includes the satellite-based positioning system receiver not consuming any power, or very little power (substantially less power than when operating).

For example, in some applications power savings of the battery life of the mobile device may become more favorably, and therefore, the state selection process of the satellite-based positioning system receiver (for example, a GPS receiver) can be biased towards the low-power (GPS receiver off) state.

For an embodiment, the high-power state includes an on-state, the low-power state includes an off-state, and the transitional state includes a wakeup state. A fourth possible state includes a standby state. The on-state indicates that the satellite-based positioning system receiver is powered up and operational. This can also be described as the high-power state for this is the operational state in which the satellite-based positioning system receiver consumes that most power. For minimizing power consumption of the mobile device that utilizes the satellite-based positioning system receiver for location information, ideally the high-power or on-state is minimized in duration. The off-state suggests that the satellite-based positioning system receiver is off and not consuming any power. However, an embodiment includes a low-power state in which the satellite-based positioning system receiver is consuming less power than when the satellite-based positioning system receiver is in the high-power or on-state.

As previously described, for at least some embodiments, the mobile device can transition to the low-power state from the transitional state, and can transition to the low-power state from the high-power state, and can only transition to the transitional state from the low-power state. Further, for an embodiment the conditional requirements of the location related information (for example, mobile device sensor information) or location information (for example, satellite-based positioning system receiver (for example, GPS receiver)) is harder to meet in order for the mobile device to transition from the high-power state to the low-power state, than conditional requirements of the location related information or the location information to transition from the transitional state to the low-power state. The variances in the threshold or conditions required for these transitions in states (high power state to low power state, transitional state to low power state) help to avoid the previously mentioned binary switching of the satellite-based positioning system receiver on and off, thereby avoiding a waste of power.

For at least some embodiment, if the conditional requirements of the location related information and location information in order for the mobile device to transition from the transitional state to the high-power state is not met within the predetermined period of time, the mobile device is automatically transitioned to the low-power state. That is, the mobile device is only allowed to stay in the transitional state for a finite period of time. If during the finite period of time the mobile device does not transition to the high power state because the conditions of the location information required to make such a transition are not met, the mobile device automatically transitions to the low-power state.

For at least some embodiments, the conditional requirements of the location related information or location information for the mobile device to transition from the high-power state to the low-power state, and the conditional requirements of the location related information or the location information for the mobile device to transition from the transitional state from the low-power state, are adaptively adjustable. It can be desirable is adjust threshold requirement to be met for activating the satellite-based positioning system (GPS) receiver. For example, the threshold requirements can adaptively adjusted based on manufacturer and model of the mobile device, an application purpose (more accuracy or more battery life), and/or current battery level of the mobile device.

For at least one embodiment, location samples are obtained from the satellite-based positioning system receiver at a greater rate in the transitional state than in the high-power state.

The transitional wakeup state is a transitional state. That is, the wakeup state is maintained while a controller of the mobile device determines whether to transition to the high-power state or the low-power state. For an embodiment, the controller of the mobile device continuously analyzes the collected location related information of the mobile device to determine which state (low-power or high-power) to transition to. If the controller cannot determine a state to transition to within a predetermined period of time, the controller automatically transitions into one state or the other. That is, the transitional state effectively times out, and a decision is made upon timing out.

The standby state includes a state in which the GPS receiver is turned off if motion of the mobile device is predictable. If predictable, other method (such as motion analysis of sensed motions signals) can be used to estimate the location of the mobile device without the use of a GPS receiver. Therefore, power of the battery of the mobile device can be conserved by turning the GPS receiver off.

For an embodiment, the collected location related information includes mobile information sensed by motion sensors of the mobile device. For an embodiment, the motion sensors include accelerometers, gyroscopes, or a digital compass within the mobile device. The sense motion can be used to approximate or supplement the location of the mobile device.

For an embodiment, a WiFi signature can be used to estimate motion of the mobile device. That is, a list of WiFi signals received from different WiFi routers can be unique to a location of the mobile device. By monitoring the different lists (signatures) of the list of received WiFi signals, a controller can estimate the future locations of the mobile device. A change in the list (signature) of receive WiFi signals received by the mobile device can indicate a change in location or motion of the mobile device. The WiFi list (signature) varies depending upon the WiFi routers (number) and the signal strength of the received WiFi signals. An exemplary list includes a list of all the WiFi routers the mobile device is receiving signals from, and the list is ordered depending on the relative strength of each WiFi signal. As the location of the mobile device changes, the WiFi signature changes.

For an embodiment, the collected location related information includes collected network location information of the mobile device. Tower locations of received cellular or WiFi signals can be used to approximate the location of the mobile device.

For an embodiment, the collected location related information comprises collected radio frequency (RF) beacon information of the mobile device. That is, for example, RF beacon information from WiFi access points or nearby Bluetooth devices are received by the mobile device, and utilized for location estimation. The RF beacon information can include 1) MAC address or BSSID of an access point or a base station tower, or 2) a received strength (RSSI) of signals received from an access point or base station tower. Based on the received signals, the mobile device can determine whether it is leaving a coverage area of an access point or base station tower, and for example, entering the coverage area of another access point or base station tower.

A previously described, various conditions of the mobile device can be utilized for determining when to transition from one state or another. An embodiment includes controllably transitioning the satellite-based positioning system receiver of the mobile device from operation in the high-power state to operation in the low-power state based on detecting signal loss of the satellite-based positioning system receiver for a certain time duration, or detecting that the mobile device has an average speed less than a threshold. The average speed of the mobile device being less than the threshold suggests the mobile device is stationary or near-stationary. The low-power state is desirable when it is determined that that the mobile device is not moving, or the mobile device has entered a building.

An embodiment includes maintaining satellite-based positioning system receiver in the high-power state based on detecting that a current speed of the mobile device is greater than a threshold or a computed speed ratio of the mobile device is greater than a threshold. Here, it is determined that the mobile device of the user is moving at a speed great enough to suggest that the use in within a moving vehicle. The computed speed ratio is an estimate of how much of a percentage of time of a period the mobile device is moving greater than a threshold speed. The speed/velocity of the mobile device can be determined from satellite-based positioning system receiver (GPS) or calculated by the mobile device by other means, such as motion sensing.

Another embodiment includes controllably transitioning the satellite-based positioning system receiver of the mobile device from operation in the low-power state to operation in the wakeup state based detecting that the mobile device is leaving a building, or detecting that a network location has changed greater than a threshold for a number location samples per a unit of time. Leaving a location can be determined, for example, through the changes of WiFi beacons that include location information.

Another embodiment includes maintaining the satellite-based positioning system receiver in the low-power state based on detecting sensing deviation of motion of the mobile device of less than a threshold. Motion detection can be established, for example, with motion sensing devices, such as, accelerometers or gyroscopes.

Another embodiment includes controllably transitioning the satellite-based positioning system receiver of the mobile device from operation in the transition state to operation in the low-power state based detecting that a satellite-based positioning system receiver wakeup was a false alarm after checking that a current speed of the mobile device is greater than a threshold or a computed speed ratio of the mobile device is greater than a threshold. The satellite-based positioning system receiver can be used to determine the speed.

Another embodiment includes controllably transitioning the satellite-based positioning system receiver of the mobile device from operation in the transition state to operation in the high-power state based on detecting that a current speed of the mobile device is greater than a threshold or a computed speed ratio of the mobile device is greater than a threshold.

Another embodiment includes controllably maintaining the satellite-based positioning system receiver of the mobile device operating in the transition state based determining that enough information is not yet available to make a decision of whether to transition to the low-power state or the high-power state, and the mobile device has been operating in the transitional state for less than a time threshold.

Another embodiment includes controllably transitioning the satellite-based positioning system receiver of the mobile device from operation in the high-power state to operation in a standby state based on detecting that the mobile device is moving a speed greater than a threshold. The velocity is also determined to be constant within a threshold, thereby allowing the location of the mobile device to be accurately estimated without the satellite-based positioning system receiver location information. This can happen, for example, if the mobile device is within a moving vehicle, and the speed of the vehicle is relatively constant.

Another embodiment includes controllably transitioning the satellite-based positioning system receiver of the mobile device from operation in standby state to operation in a high-power state based on detecting that the mobile device is not moving smoothly with a speed greater than a threshold. For an embodiment, this includes detecting a sensed motion of the mobile device greater than a threshold, or detecting a change is a gravity reference direction. This can include, for example, sensing a condition in which the mobile device was in, for example, a moving vehicle that has slowed down or stopped.

Another embodiment includes the wakeup state comprises a transition state wherein the satellite-based positioning system receiver runs, and after a period of collecting information, the satellite-based positioning system receiver maintains the wakeup state or transitions to the high-power state or the low-power state.

Another embodiment includes the standby state wherein the satellite-based positioning system receiver is turned off, and after a period of collecting information, the satellite-based positioning system receiver transitions back to the high-power state when motion makes estimating the location of the mobile device unpredictable without the satellite-based positioning system receiver.

Figure 5:
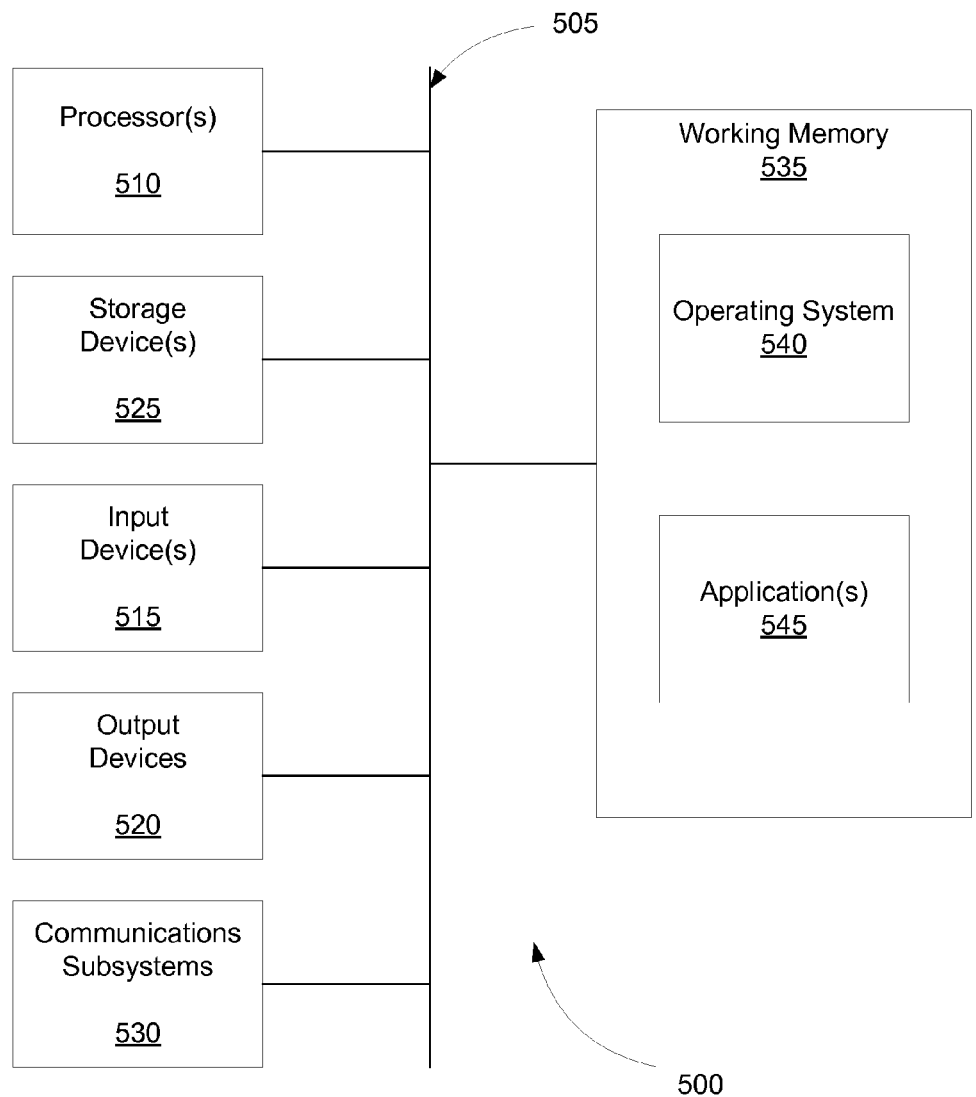
FIG. 5 shows a schematic illustration of one embodiment of a computer system that can perform the methods of the described embodiment.

FIG. 5 shows a schematic illustration of one embodiment of a computer system 500 that can perform the methods of the described embodiment. It should be noted that FIG. 5 is meant only to provide a generalized illustration of various components, any or all of which may be utilized as appropriate. FIG. 5, therefore, broadly illustrates how individual system elements may be implemented in a relatively separated or relatively more integrated manner. The computer system 500 can include all or a portion of the controller within the mobile device, or the computer system 500 can include all or a portion of an uplink server that the mobile device is able to communicate with.

The computer system 500 is shown comprising hardware elements that can be electrically coupled via a bus 505 (or may otherwise be in communication, as appropriate). The hardware elements can include one or more processors 510, one or more input devices 515, which can include without limitation a mouse, a keyboard and/or the like; and one or more output devices 520, which can include without limitation a display device, a printer and/or the like. The computer system 500 may further include (and/or be in communication with) one or more storage devices 525. The computer system 500 also can comprise software elements, shown as being located within the working memory 535, including an operating system 540 and/or other code, such as one or more application programs 545, which may comprise computer programs of the described embodiments, and/or may be designed to implement methods of the described embodiments and/or configure systems of the embodiments as described herein.

As herein described, an embodiment of the computer system 500 includes at least a portion of a mobile device. The mobile device includes a satellite-based positioning receiver and a controller. The controller is operative to set the mobile device to operate in one of a high-power state, a low-power state, or a transitional state based on the collected location related information, wherein the satellite-based positioning system receiver of the mobile device generates location information in the transitional state and in the on-state, and the satellite-based positioning system receiver does not generate location information in the low-power state, and the satellite-based positioning system receiver consumes less power in the low-power state than in the high-power state and the transitional state. Further, when operating in the transitional state, the controller repeatedly checks the collected location related information and transitions to the low-power state or the high-power state based on the collected location related information, or if a transition is not made after a predetermined period of time, the controller automatically transitions the satellite-based positioning system receiver into either the high-power state, a low-power state.

Another embodiment includes a program storage device readable by a machine (such as the computer system 500), tangibly embodying a program of instructions executable by the machine to perform a method of controlling a location sensing system of a mobile device. The method includes controllably setting the mobile device to operate in one of a high-power state, a low-power state, or a transitional state based on the collected location related information, wherein a satellite-based positioning system receiver of the mobile device generates location information in the transitional state and in the on-state, and the satellite-based positioning system receiver does not generate location information in the low-power state, and the satellite-based positioning system receiver consumes less power in the low-power state than in the high-power state and the transitional state. Further, when operating in the transitional state, the mobile device repeatedly checks the collected location related information and transitions to the low-power state or the high-power state based on the collected location related information, or if a transition is not made after a predetermined period of time, the controller automatically transitions the satellite-based positioning system receiver into either the high-power state, a low-power state.

Although specific embodiments have been described and illustrated, the embodiments are not to be limited to the specific forms or arrangements of parts so described and illustrated.

What is claimed:

1. A method of controlling a location sensing system of a mobile device, comprising:
   collecting location related information of the mobile device; and
   controllably setting the mobile device to operate in one of a high-power state, a low-power state, or a transitional state based on the collected location related information; wherein
   a satellite-based positioning system receiver of the mobile device generates location information in the transitional state and in the high-power state, and the satellite-based positioning system receiver does not generate location information in the low-power state, and the satellite-based positioning system receiver consumes less power in the low-power state than in the high-power state and the transitional state; and wherein
   when operating in the transitional state, the mobile device repeatedly checks the collected location related information and transitions to the low-power state or the high-power state based on the collected location related information, and if a transition is not made after a predetermined period of time, the controller automatically transitions the satellite-based positioning system receiver into either the high-power state or the low-power state; wherein
   the mobile device is operable to transition to the low-power state from the transitional state, and operable to transition to the low-power state from the high-power state, and operable to only transition to the transitional state from the low-power state, and wherein conditional requirements of the location related information or location information is harder to meet in order for the mobile device to transition from the high-power state to the low-power state, than conditional requirements of the location related information or the location information to transition from the transitional state to the low-power state.

2. The method of claim 1, wherein the high-power state comprises an on state, the low-power state comprises an off state, and the transitional state comprises a wake up state, and fourth state includes a standby state.

3. The method of claim 2, wherein the wakeup state comprises a transition state wherein the satellite-based positioning system receiver runs, and after a period of collecting information, the satellite-based positioning system receiver maintains the wakeup state or transitions to the high-power state or the low-power state.

4. The method of claim 2, wherein the during standby state the satellite-based positioning system receiver is turned off, and after a period of collecting information, the satellite-based positioning system receiver transitions from the standby state to the high-power state or maintains operation in the standby state.

5. The method of claim 1, wherein if the conditional requirements of the location related information and location information in order for the mobile device to transition from the transitional state to the high-power state is not met within the predetermined time-out period of time, the mobile device is automatically transitioned to the low-power state.

6. The method of claim 1, wherein the conditional requirements of the location related information or location information for the mobile device to transition from the high-power state to the low-power state, and the conditional requirements of the location related information or the location information for the mobile device to transition from the transitional state from the low-power state, are adaptively adjustable.

7. The method of claim 1, further comprising obtaining location samples by the satellite-based positioning system receiver at a greater rate in the transitional state than in the high-power state.

8. The method of claim 1, wherein the collected location related information comprises mobile information sensed by motion sensors of the mobile device.

9. The method of claim 1, wherein the collected location related information comprises mobile information that includes a determination whether a location of the mobile device changed determined by analyzing received network signals.

10. The method of claim 1, wherein the collected location related information comprises collected network location information of the mobile device.

11. The method of claim 1, wherein the collected location related information comprises collected radio frequency (RF) beacon information of the mobile device.

12. The method of claim 1, further comprising controllably transitioning the satellite-based positioning system receiver of the mobile device from operation in the high-power state to operation in the low-power state based on detecting signal loss of the satellite-based positioning system receiver for a certain time duration, or detecting that the mobile device has an average speed less than a threshold.

13. The method of claim 1, further comprising maintaining satellite-based positioning system receiver in the high-power state based on detecting that a current speed of the mobile device is greater than a threshold or a computed speed ratio of the mobile device is greater than a threshold.

14. The method of claim 1, further comprising controllably transitioning the satellite-based positioning system receiver of the mobile device from operation in the low-power state to operation in the transitional state based detecting that the mobile device is leaving a building, or detecting that a network location has changed greater than a threshold for a number location samples per a unit of time.

15. The method of claim 1, further comprising maintaining the satellite-based positioning system receiver in the low-power state based on detecting sensing deviation of motion of the mobile device of less than a threshold.

16. The method of claim 1, further comprising controllably transitioning the satellite-based positioning system receiver of the mobile device from operation in the transition state to operation in the low-power state based detecting that a satellite-based positioning system receiver wakeup was a false alarm after checking that a current speed of the mobile device is less than a threshold or a computed speed ratio of the mobile device is less than a threshold.

17. The method of claim 1, further comprising controllably transitioning the satellite-based positioning system receiver of the mobile device from operation in the transition state to operation in the high-power state based on detecting that a current speed of the mobile device is greater than a threshold or a computed speed ratio of the mobile device is greater than a threshold.

18. The method of claim 1, further comprising controllably maintaining the satellite-based positioning system receiver of the mobile device operating in the transitional state based on determining that enough information is not yet available to make a decision of whether to transition to the low-power state or the high-power state, and the mobile device has been operating in the transitional state for less than a time threshold.

19. The method of claim 1, further comprising controllably transitioning the satellite-based positioning system receiver of the mobile device from operation in the high-power state to operation in a standby state based on detecting that the mobile device is moving a speed greater than a threshold.

20. The method of claim 1, further comprising controllably transitioning the satellite-based positioning system receiver of the mobile device from operation in standby state to operation in a high-power state based on detecting a sensed motion of the mobile device greater than a threshold, or detecting a change is a gravity reference direction.

21. A mobile device, comprising:
a satellite-based positioning receiver;
a controller, the controller operative to set the mobile device to operate in one of a high-power state, a low-power state, or a transitional state based on the collected location related information, wherein the satellite-based positioning system receiver of the mobile device generates location information in the transitional state and in the high-power state, and the satellite-based positioning system receiver does not generate location information in the low-power state; wherein when operating in the transitional state, the mobile device repeatedly checks the collected location related information and transitions to the low-power state or the high-power state based on the collected location related information, and if a transition is not made after a predetermined period of time, the controller automatically transitions the satellite-based positioning system receiver into either the high-power state or the low-power state; wherein the mobile device is operable to transition to the low-power state from the transitional state, and operable to transition to the low-power state from the high-power state, and operable to only transition to the transitional state from the low-power state, and wherein conditional requirements of the location related information or location information is harder to meet in order for the mobile device to transition from the high-power state to the low-power state, than conditional requirements of the location related information or the location information to transition from the transitional state to the low-power state.

22. The mobile device of claim 21, wherein if the conditional requirements of the location related information and location information in order for the mobile device to transition from the transitional state to the high-power state is not met within the predetermined period of time, the mobile device is automatically transitioned to the low-power state.

23. The mobile device of claim 21, wherein the conditional requirements of the location related information or location information for the mobile device to transition from the high-power state to the low-power state, and the conditional requirements of the location related information or the location information for the mobile device to transition from the transitional state from the low-power state, are adaptively adjustable.

24. The mobile device of claim 21, further comprising obtaining location samples by the satellite-based positioning system receiver at a greater rate in the transitional state than in the high-power state.

* * * * *